Figure 1:
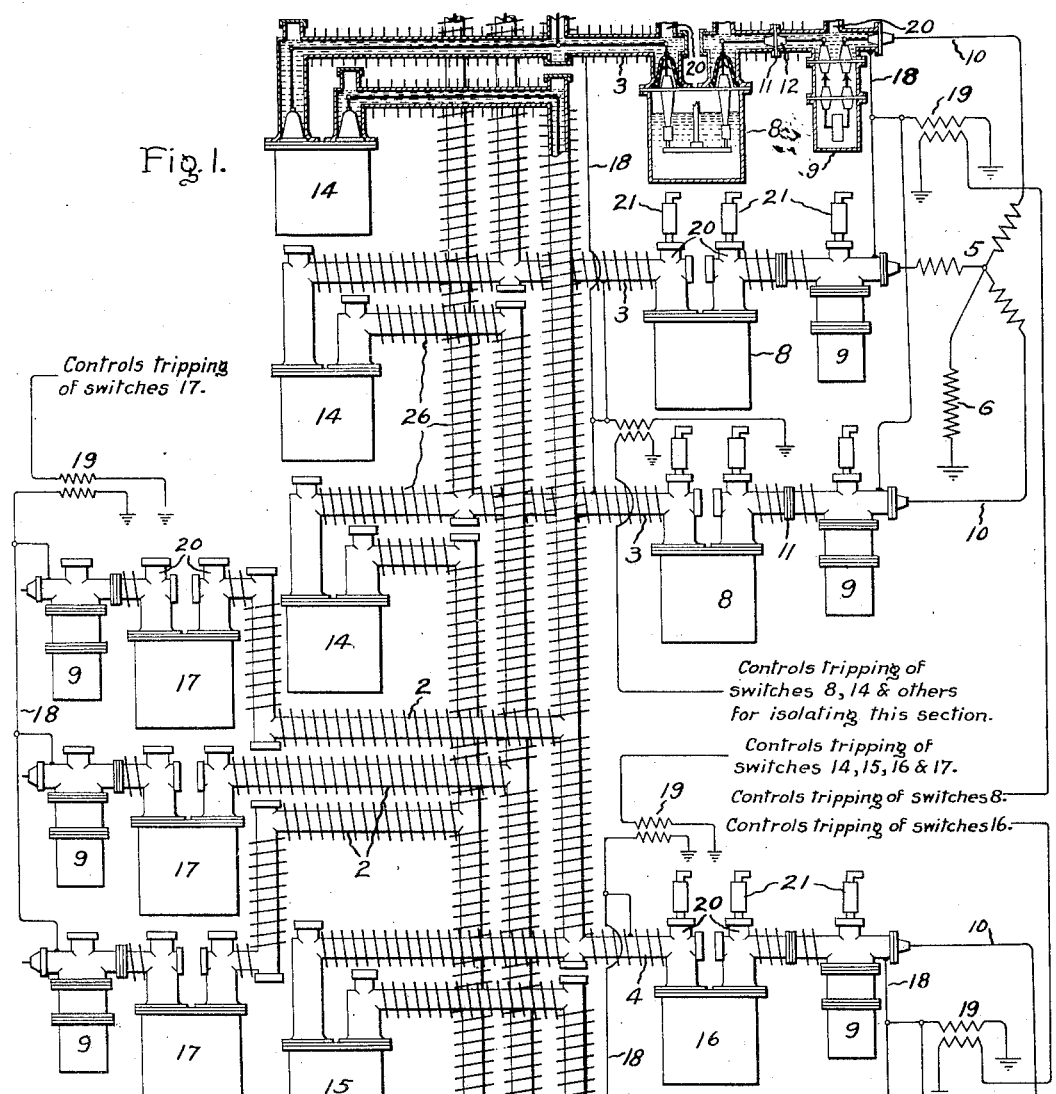

Oct. 22, 1929.  R. M. SPURCK  1,733,077

HIGH POTENTIAL SWITCHING STATION

Filed Jan. 31, 1927

Inventor:
Robert M. Spurck,
by *Alexander F. Lunt*
His Attorney.

Patented Oct. 22, 1929

1,733,077

UNITED STATES PATENT OFFICE

ROBERT M. SPURCK, OF SCHENECTADY, NEW YORK, ASSIGNOR TO GENERAL ELECTRIC COMPANY, A CORPORATION OF NEW YORK

HIGH-POTENTIAL SWITCHING STATION

Application filed January 31, 1927. Serial No. 164,971.

My invention relates to switching equipment for high potential electric power stations and it has for its object the provision of an improved arrangement in which are combined such desirable features as moderate space requirements, a high factor of safety to the operating force and to the apparatus employed, automatic detection and isolation of faults whereby interruptions in the continuity of service are minimized, and moderate installation and maintenance cost.

My invention will be better understood from the following description taken in connection with the accompanying drawing, and its scope will be pointed out in the appended claims.

In the single figure of the drawing which is a diagrammatic representation of a switching equipment involving my invention the phase bus bars A, B and C are shown separately armored, each being contained in a separate grounded metallic sheath or enclosure 1. Each bus bar or conductor is centrally mounted by insulation means in the respective enclosure and the space between the conductor and the walls of the enclosure filled with a suitable insulating material such as oil or petrolatum. Each phase conductor of the feeder circuits, both incoming and outgoing, also is mounted in a separate grounded sheath like those enclosing the bus bars. I have illustrated the system as having an outgoing feeder 2 and two incoming feeders 3 and 4, each connecting with a separate three phase source 5. It will be understood that one or more feeders may lead out from each bus section. Each source 5 is Y-connected and has its neutral point grounded through the controlling resistance 6. Since the sheath enclosing each phase bus bar and feeder conductor is grounded, any breakdown of insulation that may occur will not produce an interphase short circuit but will be limited to a fault to ground in which case the short circuit current will be limited to a safe value by the resistance 6 in the grounded neutral.

Each phase conductor of the incoming feeder 3 is shown controlled by a separate oil switch 8, these switches being preferably of the type in which the disconnect is combined with the oil switch, the movable terminals of the disconnect being mounted on the bushings of the oil switch whereby the disconnect is opened by lowering the oil switch and is closed by raising the same. I have also shown a current transformer 9 in each phase conductor of the feeder whose connection with the feeder conductor is controlled in a similar manner. The other incoming feeder 4 and any outgoing feeder 2 are provided respectively with switches 16 and 17 similar to switches 8. They also have transformers 9 and are insulated like feeder 3. Each phase feeder conductor also is enclosed in a sheath, like those enclosing the bus bars, up to the point where it joins the cable 10 and is insulated therefrom in the same manner. The sheath covering each feeder phase conductor is interrupted at the oil switch 8, the two ends terminating at the fixed disconnect terminals of the switch. These sheaths may if desired be further divided for example by partitions such as shown at 11 through which extends an insulator bushing 12 carrying the conductor. Such a division or sectionalizing of the sheath is of advantage in preventing a too great loss of oil in the event of a failure in the sheath since only the oil in the affected section would probably be lost. For the same purpose and in a similar manner I also sectionalize the bus bar sheaths. In order that a fault occurring in any part of the station equipment may not necessarily cripple the entire station the bus bars are sectionalized and the sections connected by suitable bus section switches such as shown at 14 and 15, having disconnects constructed similarly to those of the feeder switches 8. I divide the bus sheaths into sections corresponding to the bus sections which they enclose. Additional bus sheath sections may if desired be provided intermediate the bus section switches as for example by partitions such as shown at 11 in feeder 3.

While I do not expect that a breakdown of insulation will occur except very rarely between a phase conductor and its enclosing sheath, I make provision for taking care of a fault of this nature. One result of such a fault would be the rapid formation of a large amount of gas in the sheath. To avoid the danger of rupturing the sheath or associated parts I have provided expansion chambers 20 in the various sheath sections. These expansion chambers will be arranged on the sheaths of the bus bar and feeder sections in such numbers and in such locations and will have capacities which are necessary in each individual station taking into consideration the rate of gas formation and the total amount of gas that may be formed before the section in trouble is cut out. By way of example only I have shown the expansion chambers 20 arranged at the hand holes opposite the points of connection between the feeders and the bus bars and between the feeders and feeder switches and transformers. Obviously they may be placed at other and additional points if desired.

These expansion chambers may be provided with separating chambers 21 if desired from which the gas is vented directly or is piped therefrom so as to discharge at a more remote point. I may also employ frangible diaphragms at various points in the sheath sections, such for example as shown at 22 in Fig. 2 which will be broken by a predetermined pressure within the sheath and allow the insulating oil therein to escape through a discharge pipe indicated at 23 into a sump, not shown, in which burning can do no harm or which may be constructed so that flame may not be transmitted thereto. Only the limited amount of oil contained in the section or segregated element of the system is discharged and the other sections or elements remain in operation unaffected by the disconnection and emptying of the faulty section.

I insulate the sheaths of each bus and feeder section as determined by the bus section and feeder switches and in Fig. 1, I have shown the respective sections grounded by ground busses 18 through a ground bus relay system which I have diagrammatically indicated. Such a system may for example be like that disclosed in the copending application of Henry R. Summerhayes, Serial No. 88,160, filed February 13, 1926, and assigned to the same assignee as the present application. Each ground bus 18 is shown for simplicity as grounded through the primary of a transformer 19 of which the secondary controls the tripping of the switches which control the current flow to that particular section. The ground bus relay sections and the previously described oil sections may or may not be the same, as desired. I have shown the ground bus relay system applied to the sheaths of the feeder conductors, the switches 8, 16 and 17, like the sectionalizing switches 14 and 15 being convenient points of sectionalizing. A current flow through the ground busses 18 applied to the sheaths of the feeder conductors between the oil switches and cables causes the tripping of the appropriate feeder switch, thereby isolating the feeder section in trouble from the remainder of the system. Similarly a current flow through any ground bus 18 applied to a bus section will cause the tripping out of the sectionalizing switches at opposite ends of that section and the switches of all feeders connecting with that section.

Figure 2:
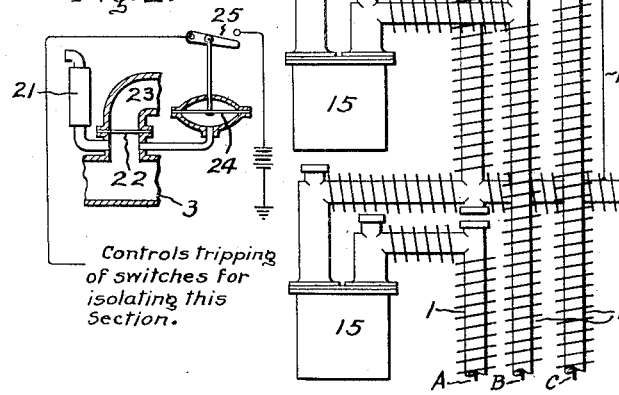

Other means may be provided for tripping out the switches controlling the current flow to that section or element of the system in which a fault occurs. For example, means responsive to the gas pressure developed may be arranged to trip the isolating switches either mechanically, or electrically as illustrated in Fig. 2, where the diaphragm 24 in communication at one side with the interior of the sheath operates the switch 25 to close the switch tripping circuit when the pressure reaches a predetermined value. Upon a current flow between a conductor and its sheath the gas pressure operated means is thus affected and the tripping of the isolating switches brought about.

In certain cases it may be found desirable to increase the heat radiation from the sheaths. This may be done by providing the sheaths with ribs or fins 26 in good thermal connection with the sheaths. Losses in the conductors forming the bus bars and feeders may be reduced by well known means such as stranding or the use of hollow conductors.

While my invention is of particular applicability to polyphase alternating current systems, certain features thereof may be applied to single phase alternating current systems, as, for example, where the mid point of the source is grounded through a current limiting means, and one line or bus conductor is above ground potential at the instant when the other line of bus conductor is below ground potential. In this single-phase arrangement, the phase conductors are at 180° phase difference, whereas in a three-phase system they are at 120° phase difference, and in the one-quarter-phase system at 90° phase difference. Similarly, certain features of my invention may be applied to high potential direct current systems in which the positive and negative lines or busses are enclosed in oil-filled chambers, and the mid point of the source is grounded through a current limiting means. In either such single-phase alternating current system or direct current system, a fault of limited current must develop between one conductor and the grounded armor before a short circuit between line conductors can develop. The division of the system into sectionalized or segregated elements and the ground current or gas pressure means may be applied for segregating the faulty section, and likewise the means for emptying any faulty section of oil may be embodied. Therefore, in the appended claims, where I refer to conductors of opposite polarity, I intend to include by such expression either a single-phase alternating current system or a direct current system.

While I have illustrated and described a particular arrangement of parts, and diagrammatically indicated particular devices therein, it will be apparent to those skilled in the art, from reading the foregoing specification, that changes and modification may be made in the apparatus and the arrangement thereof, and I, therefore, aim in the appended claims to cover all such changes and modifications as fall within the true spirit and scope of my invention.

What I claim as new and desire to secure by Letters Patent of the United States is:

1. A polyphase switching station comprising a plurality of separate phase conductors, separate armor enclosing each phase conductor, insulating liquid separating the conductors from the armor, and means for preventing damage to said armor from pressure due to sudden gas formation therein including a plurality of external expansion chambers associated with the armor enclosing each phase conductor.

2. A polyphase switching station comprising a source having a grounded neutral and current limiting means therein, a plurality of separate phase conductors connected to said source, separate grounded armor enclosing each phase conductor, switches for separating said phase conductors into sections and a switch for separating the source from the phase conductors, insulating means for dividing said armor into corresponding sections, and means responsive to current flow to ground from the armor of any section for operating said switches to isolate the corresponding conductor section from adjacent sections and from said source.

3. A polyphase switching station comprising a source having a grounded neutral and current limiting means therein, a plurality of phase bus bars, separate grounded metallic enclosures for the respective bus bars, said bus bars and enclosures being divided into sections, section switches arranged between said conductor sections, insulating liquid between each bus bar and its enclosure, feeder conductors connected to said bus bars, a grounded metallic enclosure for each feeder conductor, means associated with said metallic enclosures forming expansion chambers for cushioning the shock due to gas formation therein, and means responsive to a breakdown of the insulating liquid between the conductor of any section and the enclosing sheath thereof for tripping open the switches controlling that section.

4. An electric switching station comprising a plurality of conductors of opposite polarity divided into a plurality of sections, isolating switches between adjacent sections, a plurality of sources each having its midpoint grounded through a current limiting device, connected with the conductors of the respective sections, a switch controlling the connection of each source with its section, grounded metallic sheaths enclosing the respective conductors and containing insulating liquid separating the conductors from the sheaths, and means affected by current flow between a conductor and its sheath in any section for causing the operation of the switches at both ends of that section and the switch controlling the connection of the source thereto.

In witness whereof, I have hereunto set my hand this 28th day of January, 1927.

ROBERT M. SPURCK.